Patented July 29, 1924.

1,503,319

UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF PRODUCING MIXTURES OF NITROGEN AND HYDROGEN.

No Drawing. Application filed May 13, 1920. Serial No. 381,183.

*To all whom it may concern:*

Be it known that I, BIRGER FJELD HALVORSEN, a subject of the King of Norway, residing at Christiania, Norway, have invented certain new and useful Improvements in Processes of Producing Mixtures of Nitrogen and Hydrogen; and I do hereby declare the following to be a full, clear, and exact description of the invention, such as will enable others skilled in the art to which it appertains to make and use the same.

This invention relates to the production of mixtures of nitrogen and hydrogen and has for its object a process for the production of such gas mixtures from air and water by the use of sulphides as reducing agents.

The sulphides employed may consist of sulphide ores or other metal sulphides.

The present process comprises in combination the operation of reacting upon a sulphide with water at a raised temperature so as to obtain a mixture of hydrogen and sulphur dioxide, subjecting another portion of sulphide to roasting with air to produce a mixture of nitrogen and sulphur dioxide and removing sulphur dioxide from the gas mixtures by absorption in bases or water.

When the process is carried into effect by the use of iron pyrites as a reducing agent the process may suitably be carried into effect as follows:

A portion of the pyrites is treated in a suitable apparatus with water at a high temperature, whereby iron oxide and a gas mixture consisting of sulphur dioxide and hydrogen is obtained. This gas mixture is freed from sulphur dioxide by being passed in contact with water or a base such as lime whereby the sulphur dioxide is absorbed, pure hydrogen gas being obtained.

In another apparatus a portion of iron pyrites is roasted with air, an excess of air being avoided as far as possible. In this manner iron oxide and a gas mixture substantially consisting of sulphur dioxide and nitrogen is obtained.

The gas mixture is treated as above described to remove sulphur dioxide therefrom, whereby nitrogen gas containing some oxygen is obtained. This gas is treated with sulphite as obtained by the above described absorption operation whereby the oxygen is absorbed, pure nitrogen being obtained.

The nitrogen so produced is mixed with hydrogen obtained as above described, and the resulting gas mixture may be used in the synthesis of ammonia.

In the described process sulphur dioxide is obtained as a byproduct and this sulphur dioxide may be utilized to produce sulphite or it may be absorbed in water. From its aqueous solution the sulphur dioxide can easily be expelled in a pure condition.

Instead of absorbing the sulphur dioxide obtained by the roasting operation in lime or water it may be wholly or in part absorbed in ammonia to produce ammonium sulphite which is used to remove the oxygen contained in the roaster gases.

I claim:

The process of producing nitrogen bearing gas suitable for a synthetic production of ammonia, comprising in combination the steps of passing air in contact with a metal sulphide at an elevated temperature, removing sulphur dioxide from the resulting gas mixture by reaction with ammonia so as to obtain ammonium sulphite, and removing oxygen from the so treated gas by reacting upon the gas with the ammonium sulphite so obtained.

In testimony that I claim the foregoing as my invention, I have signed my name in presence of two subscribing witnesses.

BIRGER FJELD HALVORSEN.

Witnesses:
MARIE BERGQUIST,
FRIGOLF HEARLDSEN.